United States Patent
Gao

(10) Patent No.: US 8,897,830 B2
(45) Date of Patent: Nov. 25, 2014

(54) METHOD AND DEVICE FOR OBTAINING AN X2 INTERFACE TRANSMISSION ADDRESS OF A BASE STATION IN AN LTE SYSTEM

(75) Inventor: Yin Gao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 643 days.

(21) Appl. No.: 13/129,025

(22) PCT Filed: May 27, 2009

(86) PCT No.: PCT/CN2009/072032
§ 371 (c)(1),
(2), (4) Date: May 12, 2011

(87) PCT Pub. No.: WO2010/063170
PCT Pub. Date: Jun. 10, 2010

(65) Prior Publication Data
US 2012/0015683 A1    Jan. 19, 2012

(30) Foreign Application Priority Data
Dec. 3, 2008  (CN) .......................... 2008 1 0184509

(51) Int. Cl.
| | |
|---|---|
| H04B 7/00 | (2006.01) |
| H04W 8/26 | (2009.01) |
| H04W 40/24 | (2009.01) |
| H04W 92/20 | (2009.01) |

(52) U.S. Cl.
CPC ............... *H04W 8/26* (2013.01); *H04W 40/24* (2013.01); *H04W 92/20* (2013.01)
USPC ........................................................ 455/524

(58) Field of Classification Search
None
See application file for complete search history.

(56) References Cited

U.S. PATENT DOCUMENTS

| | | | |
|---|---|---|---|
| 2008/0130578 A1 | 6/2008 | Wang et al. | |
| 2009/0042597 A1* | 2/2009 | Yuuki | .......................... 455/525 |

FOREIGN PATENT DOCUMENTS

| | | |
|---|---|---|
| CN | 101039507 A | 9/2007 |
| CN | 101094510 A | 12/2007 |
| CN | 101132007 | 2/2008 |
| CN | 101132607 A | 2/2008 |

(Continued)

OTHER PUBLICATIONS

Discovery of neighbor eNB IP address, Aug. 18-22, 2008, 3GPP TSG-RAN WG3 #61, R3-082229, pp. 1-6.*

(Continued)

*Primary Examiner* — Nay A Maung
*Assistant Examiner* — Alejandro Rivero
(74) *Attorney, Agent, or Firm* — Edwards Wildman Palmer LLP; Howard M. Gitten

(57) ABSTRACT

A method and device for obtaining an X2 interface transmission address of a base station in an LTE system are provided. The method is implemented based on base stations, the base station, using a constructed independent message, obtains through an S1 interface a base station transmission address which is required for establishing an X2 interface connection, thus making the X2 interface connection established between the base stations. The method and device of the present invention can obtain in time transmission address information of a target base station which is to establish an X2 interface with the current base station, so that the X2 interface can be established between the base stations. This will help to implement information interaction between the base stations and embody the integrality of X2 interface attribute management in the automatic optimization of the relations between neighbor cells.

7 Claims, 4 Drawing Sheets

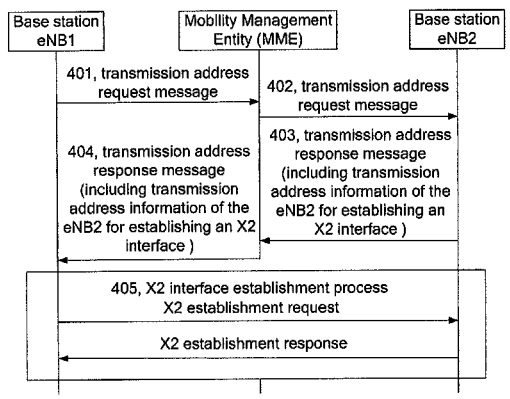

(56) References Cited

FOREIGN PATENT DOCUMENTS

| CN | 101267593 | | 9/2008 |
|---|---|---|---|
| CN | 101267593 | A | 9/2008 |
| EP | 2068522 | A1 | 6/2009 |
| JP | 2008177787 | A | 7/2008 |
| JP | 2010527183 | A | 8/2010 |
| RU | 2285346 | C2 | 10/2006 |
| WO | 2008057359 | A1 | 5/2008 |
| WO | WO2008057359 | | 5/2008 |
| WO | 2008082587 | A1 | 7/2008 |

OTHER PUBLICATIONS

S1 Application Protocol (S1AP), Jun. 2008, 3GPP TS 36.413, V8.2.0, pp. 1-178.*
Transport Layer Addresses Management to Support ANR Nov. 14, 2008.
S1 Application Protocol (S1AP) Sep. 2008.
Russian Office Action dated Jan. 16, 2012 issued in corresponding Russian application from PCT/CN2009/072032.
International Search Report in international application No. PCT/CN2009/072032, mailed on Sep. 17, 2009.
English Translation of the Written Opinion of the International Search Authority in international application No. PCT/CN2009/072032, mailed on Sep. 17, 2009.
International Search Report in International Application No. PCT/CN2009/072032 mailed Sep. 17, 2009.
Discovery of neighbor eNP IP address; Qualcomm Europe, T-Mobile; Aug. 22, 2008.
Transport Layer Addresses Lookup to Support ANR Nov. 5, 2008.
Self configuration of transport layer addresses Aug. 13, 2008.
Requirements and Evaluation of options for IP address Discovery to support X2 Setup Nov. 5, 2008
Enhanced S1 RNL Solution for ANR Self-Configuration of IP addresses Nov. 5, 2008.
Supplementary European Search Report in European application No. 09829954.8. mailed on Mar. 4, 2014.

* cited by examiner

Fig. 1

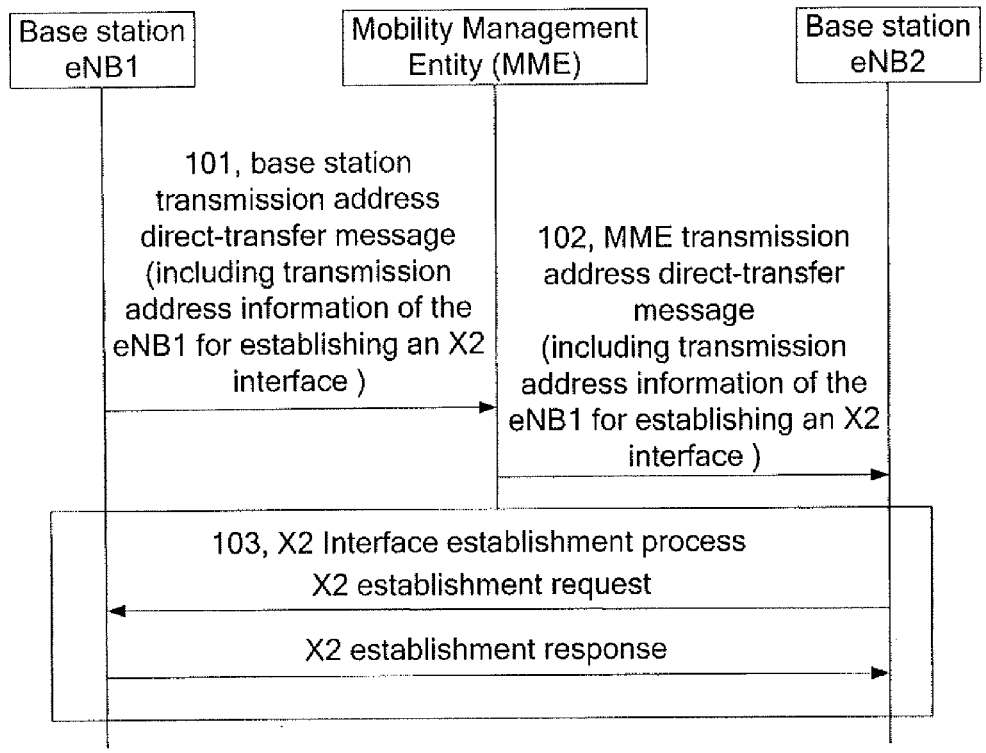

Fig. 2

| Information element name | IE type and reference information |
|---|---|
| message type | |
| source base station information | such as, the global identifier of the source base station |
| target base station information | such as, the global identifier of the target base station |
| transmission address information of the source base station | transport layer address list of the base station supporting the establishment of an X2 interface, which may be one or more transmission addresses |

Fig. 3

| Information element name | IE type and reference information |
|---|---|
| message type | |
| source base station information | such as, the global identifier of the source base station |
| target base station information | such as, the global identifier of the target base station |
| transmission address information of the source base station | transport layer address list of the base station supporting the establishment of an X2 interface, which may be one or more transmission addresses |

Fig. 4

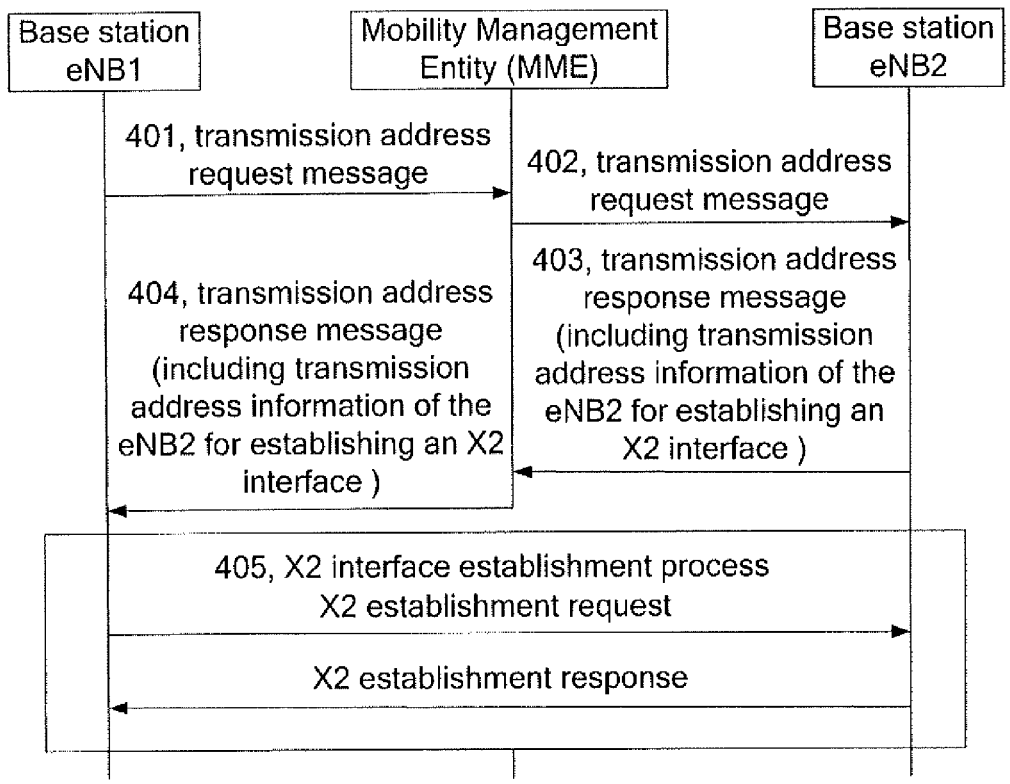

Fig. 5

| Information element name | IE type and reference information |
|---|---|
| message type | |
| source base station information | such as, the global identifier of the source base station |
| target base station information | such as, the global identifier of the target base station |

Fig. 6

| Information element name | IE type and reference information |
|---|---|
| message type | |
| source base station information | such as, the global identifier of the source base station |
| target base station information | such as, the global identifier of the target base station |
| transmission address information of the target base station | transport layer address list of the target base station supporting the establishment of an X2 interface, which may be one or more transmission addresses |

Fig. 7

| Information element name | IE type and reference information |
|---|---|
| message type | |
| source base station information | such as, the global identifier of the source base station |
| target base station information | such as, the global identifier of the target base station |
| reason of failure | such as, processing of the transmission address request message is failed |
| latency time | |

METHOD AND DEVICE FOR OBTAINING AN X2 INTERFACE TRANSMISSION ADDRESS OF A BASE STATION IN AN LTE SYSTEM

CROSS REFERENCES TO RELATED APPLICATIONS

This application is a U.S. national phase application pursuant to 35 U.S.C. § 371, of PCT/CN2009/072032 filed on May 27 2009, which claims priority to Chinese Patent Application No. 200810184509.0 filed on Dec. 3, 2008. The entire contents of the aforementioned patent applications are incorporated herein by these references.

TECHNICAL FIELD

The present invention relates to a wireless cellular communications system, in particular, to a method and device for obtaining a transmission address to establish an X2 interface in a Long Term Evolution (LTE) mobile communications system.

BACKGROUND

The 36300-800 specification describes that an LTE network consists of an Evolved UTRAN (E-UTRAN) base station (evolved Node B, eNB) and an Evolved Packet Core (EPC) and the network is flat. Wherein an E-UTRAN includes an aggregate of eNBs connected with EPCs through S1 interfaces, and the eNBs are connected with each other through X2. The S1 and X2 are logic interfaces. One EPC can manage one or more eNBs, and one eNB can be controlled by multiple EPCs and manage one or more cells.

A Self-Organizing Network (SON) is a technique for automatic network configuration and optimization. The technique is characterized by self-configuration and self-optimization, and applied to the LTE to enable LTE base stations (eNBs) to automatically configure network parameters according to certain measurements and automatically perform optimization according to network changes, thereby keeping the optimal network performance and meanwhile saving a lot of human and material resources.

In an LTE system, whether to establish an X2 interface between base stations can be determined according to a current policy, and it is necessary for either of the base stations to know a transmission address (TLA) of the other base station when initiating an X2 establishment request if the establishment of the X2 interface is needed between the two base stations. Therefore, when a base station is powered on to work in a network, it is necessary to know transmission addresses of base stations which allow establishment of X2 interfaces around it. Currently how to obtain transmission addresses of relevant base stations is a problem to be solved.

SUMMARY

The technical problem to be solved by the present invention is to provide a method and device for obtaining an X2 interface transmission address of a base station to establish an X2 interface in an LTE system.

To solve the above problem, the present invention provides a method for obtaining an X2 interface transmission address of a base station in an LTE system, which comprises: the method is implemented based on base stations, and the base station, using a constructed independent message, obtains through an S1 interface a base station transmission address required for establishing an X2 interface connection, thus making the X2 interface connection established between the base stations.

Furthermore, the method may comprise:

(a1) a source base station constructs a transmission address direct-transfer message, wherein the message comprises one or more transmission addresses of the source base station which support the establishment of an X2 interface; and (b1) the source base station sends the transmission address direct-transfer message to a target base station through an S1 interface, so that the target base station initiates a process of establishing the X2 interface between the target base station and the source base station.

Furthermore, in step (b1), the source base station may forward the transmission address direct-transfer message through a Mobility Management Entity (MME), and the transmission address direct-transfer message sent from the source base station to the MME may further comprise target base station information, and the transmission address direct-transfer message sent from the MME to the target base station may further comprise source base station information.

Furthermore, the method may comprise:

(a2) through an S1 interface, a source base station sends a transmission address request message to an MME which transparently transmits the request message to a target base station, wherein the request message comprises target base station information; and (b2) through an S1 interface, the target base station sends a transmission address request response message to the MME which transparently transmits the response message to the source base station, so that the source base station can initiate a process of establishing an X2 interface connection, wherein the transmission address request response message comprises one or more transmission addresses of the target base station which support the establishment of an X2 interface when the target base station responds successfully.

Furthermore, in step (b2), the response may be deemed to be failed when the transmission address request message is parsed in error or the transmission address is obtained in error by the target base station, and the transmission address request response message may contain the reason of failure.

Furthermore, in step (b2), when the response is failed, the transmission address request response message may contain a latency time, and the source base station receiving the transmission address request response message may execute step (a2) again when the latency time is exceeded.

Furthermore, the base station information may refer to a global identifier of the source base station or the target base station.

Furthermore, the one or more transmission addresses may be configured in the background or obtained from a network-side database.

To solve the above technical problem, the present invention also provides a device for obtaining an X2 interface transmission address of a base station in an LTE system, which comprises: the device is implemented based on base stations, and arranged to obtain through an S1 interface a base station transmission address required for establishing an X2 interface connection by using a constructed independent message, whereby the X2 interface connection can be established between the base stations.

Furthermore, the device may comprise a direct-transfer message receiving module, a direct-transfer message constructing module and a direct-transfer message sending module which are connected in turn, wherein the direct-transfer message constructing module is arranged to construct a base station transmission address direct-transfer message comprising one or more transmission addresses of the current base station which support the establishment of an X2 interface;

the direct-transfer message sending module is arranged to send the base station transmission address direct-transfer message constructed by the direct-transfer message constructing module to an opposite-end base station through an S1 interface; and the direct-transfer message receiving module is arranged to receive and parse the base station transmission address direct-transfer message sent from the opposite-end base station to initiate a process of establishing the X2 interface.

Furthermore, the device may comprise a message receiving module, a message constructing module and a message sending module which are connected in turn, wherein the message constructing module is arranged to construct a transmission address request message, and also to construct a transmission address response message according to the transmission address request message received by the message receiving module, and the transmission address response message may comprise one or more transmission addresses of the current base station which support the establishment of an X2 interface when the response is successful;

the message sending module is arranged to send the transmission address request message and the transmission address response message to an opposite-end base station through an S1 interface; and the message receiving module is arranged to receive the transmission address request message and the transmission address response message from the opposite-end base station through an S1 interface to establish an X2 interface connection according to the transmission address response message.

Furthermore, the message receiving module may further be arranged to parse the received transmission address request message and transmission address response message, and if the transmission address request message is parsed in error or the transmission address is obtained in error, the transmission address request response message constructed by the message constructing module may contain the reason of failure.

Furthermore, the one or more transmission addresses may be configured in the background or obtained from a network-side database.

The method and device of the present invention can obtain in time the transmission address information of a target base station which is to establish an X2 interface with the current base station, thus making the X2 interface established between the base stations, this will help to implement information interaction between the base stations and embody the integrality of X2 interface attribute management in the automatic optimization of the relations between neighbor cells.

BRIEF DESCRIPTION OF THE DRAWINGS

FIG. 1 illustrates a schematic flowchart of method embodiment 1 for obtaining an X2 interface transmission address of a base station in an LTE system;

FIG. 2 illustrates a structure diagram of a transmission address direct-transfer message sent from a base station;

FIG. 3 illustrates a structure diagram of a transmission address direct-transfer message sent from an MME;

FIG. 4 illustrates a schematic flowchart of method embodiment 2 for obtaining an X2 interface transmission address of a base station in an LTE system;

FIG. 5 illustrates a structure diagram of a transmission address request message;

FIG. 6 illustrates a structure diagram of a transmission address response message;

FIG. 7 illustrates a structure diagram of a transmission address response failure message.

DETAILED DESCRIPTION

The method of the present invention for obtaining an X2 interface transmission address of a base station in an LTE system is implemented based on base stations, and the base station obtains through an S1 interface a base station transmission address required for establishing an X2 interface connection, thus making the X2 interface connection established between the base stations.

There are two methods for obtaining a base station transmission address via a constructed independent message by a base station in an LTE system.

1. A source base station constructs a transmission address direct-transfer message including a base station transmission address of the source base station for establishing an X2 connection with a target base station, so that a target base station can initiate a process of establishing the X2 interface between the target base station and the source base station.

2. The target base station constructs a response message according to a request of a source base station, and the response message includes a base station transmission address of the target base station for establishing an X2 connection with the source base station, so that the source base station can initiate a process of establishing the X2 interface between the source base station and the target base station.

The above two methods are described in detail below in connection with the drawings.

Embodiment 1

According to FIG. 1, the method of the present invention for obtaining an X2 interface transmission address of a base station in an LTE system includes the following steps.

101: when needing to establish an X2 interface with a base station 2 (eNB2) or at any other time after being powered on to work, a base station 1 (eNB1) constructs a base station transmission address direct-transfer message and sends the message to an MME.

The structure of the base station transmission address direct-transfer message is as shown in FIG. 2, including the message type, target base station information, source base station information, and transmission address information of the source base station, wherein the source base station information can be omitted.

102: the MME transmits the base station transmission address direct-transfer message to the base station 2 through an MME transmission address direct-transfer message.

The structure of the MME transmission address direct-transfer message is as shown in FIG. 3, including the message type, target base station information, source base station information, and transmission address information of the source base station.

In the embodiment, the base station 1 is the source base station, the base station 2 is the target base station; the base station information is the global identifier of the base station; and the transmission address information, which is configured in the background or obtained from a network-side database, refers to a transmission address list supporting the establishment of an X2 interface, and may be one or more transmission addresses.

Operators may configure multiple transmission addresses for establishing X2 interfaces for one base station or a multimode base station as required, but finally only one of the addresses is used to establish a certain X2 interface.

103: the base station 2 can initiate a process of establishing the X2 interface between the base station 2 and the source base station according to the transmission address information of the base station 1 which is contained in the MME transmission address direct-transfer message after receiving the MME transmission address direct-transfer message.

To implement the above method, the present invention also provides a device for obtaining an X2 interface transmission address of a base station in an LTE system, the device is implemented based on base stations, the device for a target base station and that for a source base station are the same. The device includes a direct-transfer message receiving module, a direct-transfer message constructing module and a direct-transfer message sending module which are connected in turn, wherein the direct-transfer message constructing module is used for constructing a base station transmission address direct-transfer message including one or more transmission addresses of the current base station which support the establishment of an X2 interface, and the specific structure is as mentioned above;

the direct-transfer message sending module is used for sending the base station transmission address direct-transfer message constructed by the direct-transfer message constructing module to an opposite-end base station through an S1 interface; and the direct-transfer message receiving module is used for receiving and parsing the base station transmission address direct-transfer message sent from the opposite-end base station to initiate a process of establishing an X2 interface.

The one or more transmission addresses are configured in the background or obtained from a network-side database.

Embodiment 2

According to FIG. 4, the method of the present invention for obtaining an X2 interface transmission address of a base station in an LTE system includes the following steps.

401: when needing to establish an X2 interface with a base station 2 (eNB2) or at any other time after being powered on to work, a base station 1 (eNB1) constructs a transmission address request message and sends the message to an MME through an S1 interface.

402: the MME transparently transmits the transmission address request message to the base station 2 through an S1 interface after receiving the transmission address request message.

The structure of the transmission address request message, as shown in FIG. 5, includes the message type, target base station information and source base station information, wherein the source base station information can be omitted in the message sent from the base station 1 to the MME; both the target base station information and the source base station information can be omitted in the message sent from the MME to the base station 2.

403: the base station 2 constructs a transmission address response message and sends the message to the MME after receiving the transmission address request message.

If the response is successful, a transmission address response success message is constructed, and the structure of the message is as shown in FIG. 6, including the message type, target base station information, source base station information and transmission address information of the target base station.

If the response is failed, for example the request message is parsed in error or the transmission address is obtained in error, a transmission address response failure message is constructed, and the structure of the message is as shown in FIG. 7, including the message type, target base station information, source base station information, the reason of failure (for example, the request message Information Element (IE) is parsed in error or the transmission address is obtained in error) and a latency time, wherein the latency time information element means that the source base station can initiate an obtaining process again when the latency time is exceeded.

In the embodiment, the base station 1 is the source base station, the base station 2 is the target base station; the base station information is the global identifier of the base station; and the transmission address information refers to a transmission address list supporting the establishment of an X2 interface, and may be one or more transmission addresses.

404: the MME transparently transmits the transmission address response message to the base station 1.

405: after receiving the transmission address response message, the base station 1 initiates a process of establishing the X2 interface between the base station 1 and the base station 2 according to the transmission address information of the base station 2 contained in the transmission address response message if the response is successful.

To implement the above method, the present invention also provides a device for obtaining an X2 interface transmission address of a base station in an LTE system, the device is implemented based on base stations, and includes a message receiving module, a message constructing module and a message sending module which are connected in turn, wherein the message constructing module is used for constructing a transmission address request message having a structure as mentioned above, and also for constructing a transmission address response message according to the transmission address request message received by the message receiving module;

specifically, during the construction of a transmission address response message, if the processing is successful, the constructed response message is a transmission address response success message including one or more transmission addresses of the current base station which support the establishment of an X2 interface, and the specific structure of the message is as mentioned above;

the one or more transmission addresses are configured in the background or obtained from a network-side database;

if the processing is failed, for example the request message information element is parsed in error or the transmission address is obtained in error, the constructed response message is a transmission address response failure message, and the structure of the message is as mentioned above;

the message sending module is used for sending the transmission address request message and the transmission address response message to an opposite-end base station through an S1 interface; and the message receiving module is used for receiving the transmission address request message and the transmission address response message sent from the opposite-end base station through an S1 interface, and also for parsing the received request message and response message, to establish an X2 interface connection according to the transmission address response message.

In general, the same as the method of the present invention, the device of the present invention for obtaining an X2 interface transmission address of a base station in an LTE system is implemented based on base stations, and the device obtains through an S1 interface a base station transmission address required for establishing an X2 interface connection, so that the X2 interface connection can be established between the base stations.

INDUSTRIAL APPLICABILITY

The method and device of the present invention can obtain in time transmission address information of a target base station which is to establish an X2 interface with the current base station, so that the X2 interface can be established between the base stations. This will help to implement information interaction between the base stations and embody the integrality of X2 interface attribute management in the automatic optimization of the relations between neighbor cells.

What is claimed is:

1. A method for obtaining an X2 interface transmission address of a base station in an LTE system, comprising:
   (a) through an S1 interface, sending, by a source base station, a transmission address request message to a Mobility Management Entity(MME) which transparently transmits the transmission address request message to a target base station, wherein the transmission address request message comprises target base station information; and
   (b) through an S1 interface, sending, by the target base station, a transmission address request response message to the MME which transparently transmits the transmission address request response message to the source base station, so that the source base station can initiate a process of establishing an X2 interface connection, wherein the transmission address request response message comprises one or more transmission addresses of the target base station which have been successfully obtained by the target base station and support the establishment of an X2 interface, when the target base station responds successfully,
   wherein in step (b), the transmission address request response is deemed to be failed in a case when the transmission address request message is parsed in error by the target base station and in a case when the target base station fails to obtain the one or more transmission addresses of the target based station, and the transmission address request response message contains the reason of failure.

2. The method according to claim 1, wherein in step (b), when the response is failed, the transmission address request response message contains a latency time, and the source base station receiving the transmission address request response message executes step (b) again when the latency time is exceeded.

3. The method according to claim 1, wherein the one or more transmission addresses are configured in a background or obtained from a network-side database.

4. The method according to claim 1, wherein the target base station information refers to a global identifier of of the target base station.

5. The method according to claim 1, wherein the one or more transmission addresses are configured in a background or obtained from a network-side database.

6. A device for obtaining an X2 interface transmission address of a base station in an LTE system, the device being implemented as a base station, the device comprising a message receiving module, a message constructing module and a message sending module which are connected in turn, wherein
   the message constructing module is arranged to construct a transmission address request message, and also to construct a transmission address response Message according to a transmission address request message received by the message receiving module, and the transmission address response message comprises one or more transmission addresses of the device which have been successfully obtained by the device and support the establishment of an X2 interface when the response is successful;
   the message sending module is arranged to send the transmission address request message and the transmission address response message to another base station through an S1 interface; and
   the message receiving module is arranged to receive a transmission address request message and a transmission address response message from the another base station through an S1 interface to establish an X2 interface connection according to the transmission address response message,
   wherein the message receiving module is further arranged to parse the received transmission address request message and transmission address response message, and in a case which the transmission address request message is parsed in error and in a case which the device fails to obtain the one or more transmission addresses of the device, the transmission address request response message constructed by the message constructing module contains the reason of failure.

7. The device according to claim 6, wherein the one or more transmission addresses are configured in a background or obtained from a network-side database.

* * * * *